US009668204B2

(12) United States Patent
Rabii et al.

(10) Patent No.: US 9,668,204 B2
(45) Date of Patent: May 30, 2017

(54) COLLABORATIVE DEMAND-BASED DUAL-MODE WI-FI NETWORK CONTROL TO OPTIMIZE WIRELESS POWER AND PERFORMANCE

(71) Applicant: QUALCOMM Incorporated, San Diego, CA (US)

(72) Inventors: Khosro Mohammad Rabii, San Diego, CA (US); Vijay Naicker Subramaniam, San Diego, CA (US); Shivakumar Balasubramanyam, San Diego, CA (US); Fawad Shaukat, San Diego, CA (US)

(73) Assignee: QUALCOMM Inc., San Diego, CA (US)

( * ) Notice: Subject to any disclaimer, the term of this patent is extended or adjusted under 35 U.S.C. 154(b) by 133 days.

(21) Appl. No.: 14/491,174

(22) Filed: Sep. 19, 2014

(65) Prior Publication Data
US 2016/0088550 A1    Mar. 24, 2016

(51) Int. Cl.
*H04W 48/18* (2009.01)
*H04W 52/02* (2009.01)
(Continued)

(52) U.S. Cl.
CPC ....... *H04W 48/18* (2013.01); *H04W 52/0209* (2013.01); *H04W 72/02* (2013.01);
(Continued)

(58) Field of Classification Search
CPC ... H04W 84/12; H04W 76/023; H04W 88/06; H04W 48/18; H04W 52/0209;
(Continued)

(56) References Cited

U.S. PATENT DOCUMENTS 6,286,104 B1 * 9/2001 Buhle .................. H04L 63/105
707/999.009
7,391,736 B2 * 6/2008 Na ......................... H04L 1/0029
370/252
(Continued)

FOREIGN PATENT DOCUMENTS

| EP | 1638259 A2 | 3/2006 |
|----|------------|--------|
| WO | 2013133928 A1 | 9/2013 |
| WO | 2014085231 A1 | 6/2014 |

OTHER PUBLICATIONS

International Search Report and Written Opinion—PCT/US2015/045109—ISA/EPO—Nov. 17, 2015.
(Continued)

*Primary Examiner* — Brian O'Connor
(74) *Attorney, Agent, or Firm* — Paul Kuo

(57) ABSTRACT

The disclosure relates to a collaborative demand-based dual-mode Wi-Fi network control framework that may optimize wireless power and performance on wireless devices that may support multiple Wi-Fi networking technologies. In particular, a high performance Wi-Fi link may be reserved to services or applications that have substantial quality of service (QoS) requirements and conventional Wi-Fi links may be utilized to transfer data for services or applications that have typical performance requirements. For example, bandwidth requirements associated with forward traffic may be measured according to sizes and latency requirements associated with the forward traffic and the appropriate Wi-Fi networking mode may be controlled according to the forward traffic bandwidth requirements in combination with the average bandwidth and average retransmission rate associated with the conventional Wi-Fi links, among other factors. Furthermore, when no forward traffic needs to be transmitted, all Wi-Fi subsystems may enter a low power state.

30 Claims, 8 Drawing Sheets

(51) Int. Cl.
| | |
|---|---|
| H04W 72/02 | (2009.01) |
| H04W 84/12 | (2009.01) |
| H04W 72/08 | (2009.01) |
| H04W 88/06 | (2009.01) |
| H04W 92/18 | (2009.01) |

(52) U.S. Cl.
CPC .......... H04W 72/087 (2013.01); H04W 84/12 (2013.01); H04W 88/06 (2013.01); H04W 92/18 (2013.01); Y02B 60/50 (2013.01)

(58) Field of Classification Search
CPC ............. H04W 76/02; H04W 52/0216; H04W 52/0238; H04W 52/02; H04W 52/0232; H04W 76/068; H04W 28/20; H04W 28/24; H04W 72/12; H04W 72/1278; H04L 67/322; H04L 69/14
See application file for complete search history.

(56) References Cited

U.S. PATENT DOCUMENTS

| | | | |
|---|---|---|---|
| 7,643,463 B1 | 1/2010 | Linsky et al. | |
| 7,656,849 B1* | 2/2010 | Evans .................. | H04W 76/023 370/338 |
| 8,085,713 B2* | 12/2011 | Kang ..................... | H04W 28/20 370/328 |
| 8,175,059 B2* | 5/2012 | Veres ..................... | H04W 92/20 370/328 |
| 8,499,079 B2* | 7/2013 | Giles ..................... | H04W 8/183 709/220 |
| 8,554,970 B2 | 10/2013 | Suumaeki et al. | |
| 8,570,925 B2* | 10/2013 | Banerjea ........... | H04W 52/0216 370/311 |
| 8,576,762 B2 | 11/2013 | Thomas et al. | |
| 8,811,363 B2* | 8/2014 | Velasco ............... | H04L 12/1403 370/338 |
| 8,929,350 B1* | 1/2015 | Vleugels ............... | H04W 28/26 370/334 |
| 9,065,777 B2* | 6/2015 | Stanwood ........... | H04L 47/2458 |
| 9,106,452 B2* | 8/2015 | Basart .................. | H04L 12/6418 |
| 9,210,655 B2* | 12/2015 | Banerjea ........... | H04W 52/0216 |
| 9,549,080 B2* | 1/2017 | Tabet .................... | H04W 72/12 |
| 2006/0224763 A1* | 10/2006 | Altunbasak ............. | H04L 69/14 709/231 |
| 2008/0279129 A1 | 11/2008 | Zhodzishsky et al. | |
| 2009/0111378 A1 | 4/2009 | Sheynman et al. | |
| 2011/0080868 A1* | 4/2011 | Krishnaswamy ..... | H04W 48/18 370/328 |
| 2012/0121044 A1* | 5/2012 | Ueno .................... | H04B 7/0814 375/340 |
| 2013/0080663 A1 | 3/2013 | Rabii et al. | |
| 2013/0128948 A1 | 5/2013 | Rabii et al. | |
| 2013/0288674 A1 | 10/2013 | Gassend | |
| 2014/0044042 A1 | 2/2014 | Moshfeghi | |
| 2014/0120829 A1 | 5/2014 | Bhamidipati et al. | |
| 2014/0355527 A1* | 12/2014 | Vaidya ................ | H04W 76/025 370/329 |
| 2015/0103680 A1* | 4/2015 | Anand .............. | H04W 72/1231 370/252 |
| 2015/0222549 A1* | 8/2015 | Kakadia .................. | H04L 47/18 370/231 |
| 2015/0288427 A1* | 10/2015 | Wang ................ | H04W 72/1273 370/329 |

OTHER PUBLICATIONS 802.11ac: A Survival Guide, Chapter 2, 16 pages, http://chimera.labs.oreilly.com/books/1234000001739/ch02.html.

802.11ac: The Fifth Generation of Wi-Fi, CISC White Paper, Aug. 2012, pp. 1-25.

802.11n Technology, Meraki White Paper, Feb. 2011, 22 pages.

Aerohive Networks, "High-Density Wi-Fi Design Principles," 2012, 23 pages.

Banerjee S., Understanding Wireless Interference, UW Madison, Oct. 2011, 32 pages.

Brandt J., et al., "Fast Frame-Based Scene Change Detection in the Compressed Domain for MPEG-4 Video," The Second International Conference on Next Generation Mobile Applications, Services and Technologies, 2008, pp. 514-520.

Choi, et al., "Fast Motion Estimation and Mode Decision with Variable Motion Block Sizes," Proceedings of SPIE, vol. 5150, Visual Communications and Image Processing, 2003, pp. 1561-1572.

Cutress I., "MWC 2014: Wilocity brings WiGig 802.llad to Smartphones with Wil6300 Chipset," Feb. 25, 2014, 2 pages.

Duda A., "Wireless LANs and QoS," Mar. 2005, 14 pages, http://duda.imag.fr.

Frikha M., et al., "Mapping DiffServ to MAC differentiation for IEEE 802.11e," IEEE/AICT-ICIW, 2006, 5 Pages.

Gamaz N., et al., "Scene Change Detection in MPEG Domain," IEEE, 1998, pp. 12-17.

Giordano B., "Mobile MIMO: Disruptive Technology for Tablets and Super Phones," Marvell, May 2011, pp. 1-4.

Halperin D., et al., "Demystifying 802.11n Power Consumption," HotPower, 2010, pp. 1-5.

IEEE802.11ac: The Next Evolution of WiFi Standards, Qualcomm, 2012, 15 pages.

Jun Xin, et al., "Motion mapping and mode decision for MPEG-2 to H.264/AVC transcoding" Multimedia Tools and Applications, Kluwer Academic Publishers, BO LNKDDOI: 10.1007/S11042-007-0125-8, vol. 35, No. 2, Jun. 8, 2007 (Jun. 8, 2007), pp. 203-223, XP019531943.

Kraemer B., "802.11 Wireless Local Area Networks," IEEE 802, Mar. 2011, 64 pages.

Ngo C-W., et al., Motion-based Video Representation for Scene Change Detection, Special issue of IJCV on Video Computing, Aug. 2001, 27 pages.

Ni, Q. et al., "A Survey of QoS Enhancements for IEEE 802.11 Wireless LAN," Wireless Communications and Mobile Computing, Wiley, Chichester, GB, Aug. 1, 2004: vol. 4, Issue 5: pp. 1-22, XP-002323754.

Park S., et al., "Collaborative QoS Architecture between DiffServ and 802.11e Wireless LAN," IEEE/VTC, 2003, pp. 945-949.

Puthal D.K., "Quality of Service Provisioning with modified IEEE 802.11 MAC Protocol," DCS&E/NITR, Aug. 2008, 116 Pages.

Schelstraete S., An Introduction to 802.11ac, Quantenna Communications White Paper, Sep. 2011, pp. 1-10.

Shah K., "Implementation, Performance Analysis & Comparison of H.264 & VP8," UTA, May 2011, 61 Pages.

Sun H., et al., "Architectures for MPEG Compressed Bit stream Scaling," IEEE Transactions on Circuits & Systems for Video Technology, Apr. 1996, pp. 191-199.

Verenkoff B., "Understanding and Optimizing 802.11n," Buffalo Technology, Jul. 2011, 8 pages.

Yu H., et al., "An Improved Rate Control Algorithm for H.264", Conference Proceedings / IEEE International Symposium on Circuits and Systems (ISCAS) May 23-26, 2005, International Conference Center, Kobe, Japan, May 23, 2005, pp. 312-315, IEEE Service Center, Piscataway, NJ, XP010815540, DOI: 10.1109/ISCAS.2005.1464587 ISBN: 978-0-7803-8834-5.

Zhu H., et al., "A survey of quality of service in IEEE 802.11 networks," IEEE/WC, Aug. 2004, pp. 6-14.

Apostolopoulos J.G., "Video Communication and Video Streaming II: Error Resilient Video Coding," HP, Apr. 29, 2004, 59 Pages.

* cited by examiner

COLLABORATIVE DEMAND-BASED DUAL-MODE WI-FI NETWORK CONTROL TO OPTIMIZE WIRELESS POWER AND PERFORMANCE

TECHNICAL FIELD

Various embodiments described herein generally relate to a collaborative and demand-based framework that to optimize power and performance on wireless devices that support dual-mode Wi-Fi network technologies.

BACKGROUND

Wireless display systems generally include a source device that sends audio, video, and/or other multimedia data to one or more sink devices participating in a particular media share session. The media data may be played back at both a local display associated with the source device and at displays associated with each sink device. More specifically, each sink device participating in the particular media share session typically renders the received media data on a screen and audio equipment associated therewith. Furthermore, in some cases, a user may apply user inputs to the sink device (e.g., touch inputs, remote control inputs, etc.). In wireless display systems, the user inputs may be sent from one or more sink devices to the source device, and the source device may then process and apply the user inputs received from the sink devices on subsequent multimedia data sent to the sink devices. For example, the emerging Wi-Fi Display standard (also known as Miracast™) developed by the Wi-Fi alliance is based on Wi-Fi Direct and provides an interoperable mechanism to discover, pair, connect, and render multimedia data from a Wi-Fi Display source device at a Wi-Fi Display sink device.

In general, the source device and each sink device may be either mobile devices or wired devices with wireless communication capabilities. In one example, as wired devices, the source device and/or the sink devices may comprise televisions, desktop computers, monitors, projectors, or other suitable devices that include wireless communication capabilities. In this case, battery life may not be a significant concern because the source device and the sink devices are wall-plugged. However, in other examples where the source device and/or one or more sink devices are mobile or wireless devices, the source device and/or the sink devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless devices, which are typically powered by limited battery resources. In the case of a wireless display system, the source device will typically be responsible for processing all media data for display at the sink devices and the user inputs received from the sink devices. Accordingly, improved battery life and battery conservation are important concerns when designing wireless devices that may be used as a source device in a wireless display system.

Furthermore, next-generation wireless devices may be expected to wirelessly render high fidelity media data with high resolution external televisions, monitors, and other suitable displays (e.g., ~4K/8K at 60-240 Hz), which requires continuous high-throughput wireless networking according to the new directional 802.11ad standard delivering ~2 GbpS air-capacity. Meanwhile, many other use cases and/or applications with less demanding throughput may only require sporadic wireless connections that can be adequately provided using conventional Wi-Fi technologies such as 802.11n or the new 802.11ac variance. As such, depending on Wi-Fi client scenarios, required connections, and expected performance (e.g., latency, throughput, resiliency, etc.), the new high-throughput 802.11ad directional Wi-Fi networking subsystem should be smartly added to conventional Wi-Fi technologies to allow optimum control over the combined Wi-Fi infrastructure in order to provide the necessary Wi-Fi performance and platform power optimizations.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to one exemplary aspect, the disclosure relates to a collaborative demand-based dual-mode Wi-Fi network control framework that may optimize wireless power and performance on wireless devices that may support multiple Wi-Fi networking technologies. In particular, a high performance Wi-Fi link may be reserved to services or applications that have substantial quality of service (QoS) requirements and conventional Wi-Fi links may be utilized to transfer data for services or applications that have typical performance requirements. For example, bandwidth requirements associated with forward traffic may be measured according to sizes and latency requirements associated with the forward traffic and the appropriate Wi-Fi networking mode may be controlled according to the forward traffic bandwidth requirements in combination with the average bandwidth and average retransmission rate associated with the conventional Wi-Fi links, among other factors. Furthermore, when no forward traffic needs to be transmitted, all Wi-Fi subsystems may enter a low power state.

According to another exemplary aspect, a method for demand-based dual-mode Wi-Fi networking control may comprise, among other things, calculating a bandwidth requirement associated with one or more forward packets to transmit from a source device that includes at least a first Wi-Fi subsystem (e.g., implementing 802.11ad technology) and a second Wi-Fi subsystem (e.g., implementing 802.11n or 802.11ac technology), wherein the first Wi-Fi subsystem may have a higher performance level than the second Wi-Fi subsystem, selecting either the first Wi-Fi subsystem or the second Wi-Fi subsystem based on at least the bandwidth requirement associated with the one or more forward packets and the performance levels associated with the first and second Wi-Fi subsystems, and transmitting the one or more forward packets using the selected Wi-Fi subsystem.

For example, according to another exemplary aspect, calculating the bandwidth requirement associated with the one or more forward packets may comprise dividing a size associated with each forward packet by a latency requirement associated with each forward packet, wherein the bandwidth requirement comprises a first value obtained from summing the size associated with each forward packet divided by the latency requirement associated with each forward packet, whereby the first Wi-Fi subsystem may be selected if the first value exceeds a second value obtained from dividing an average bandwidth associated with the second Wi-Fi subsystem by an average retransmission rate associated with second Wi-Fi subsystem. In another example, selecting either the first Wi-Fi subsystem or the second Wi-Fi subsystem may comprise determining a minimum time-to-live among the one or more forward packets, predicting a time to transmit the one or more forward packets with the second Wi-Fi subsystem, wherein the predicted time to transmit the one or more forward packets with the second Wi-Fi subsystem comprises a sum of a size associated with each forward packet multiplied by an average retransmission rate associated with the second Wi-Fi subsystem divided by an average bandwidth associated with the second Wi-Fi subsystem, whereby the first Wi-Fi subsystem may be selected if the minimum time-to-live among the one or more forward packets equals or exceeds the predicted time to transmit the one or more forward packets with the second Wi-Fi subsystem. Otherwise, the second Wi-Fi subsystem may be selected if the bandwidth requirement associated with the one or more forward packets does not exceed the second value and the predicted time to transmit the one or more forward packets with the second Wi-Fi subsystem exceeds the minimum time-to-live among the one or more forward packets. However, assuming that the second Wi-Fi subsystem can satisfy the bandwidth requirement associated with the one or more forward packets and the first Wi-Fi subsystem is already turned on, the method may further comprise selecting the first Wi-Fi subsystem if a time since the first Wi-Fi subsystem was turned on does not exceed a hysteresis timeout value, or the second Wi-Fi subsystem may be selected if the time since the first Wi-Fi subsystem was turned on equals or exceeds the hysteresis timeout value. Furthermore, as noted above, the first Wi-Fi subsystem and the second Wi-Fi subsystem may be instructed to enter a low power mode in response to determining that no forward packets are pending transmission from the source device (e.g., after transmitting the forward packets using the selected Wi-Fi subsystem).

According to another exemplary aspect, the demand-based dual-mode Wi-Fi networking control method may further comprise reserving the first Wi-Fi subsystem having the higher performance level to forward traffic that has one or more performance requirements that cannot be satisfied using a wireless technology associated with the second Wi-Fi subsystem, sending one or more call-ahead signals to a connection manager configured to control the first Wi-Fi subsystem and the second Wi-Fi subsystem, wherein the one or more call-ahead signals instruct the connection manager to activate the selected Wi-Fi subsystem, and performing a service negotiation with a sink device intended to receive the one or more forward packets, wherein the service negotiation instructs the sink device to activate an independent physical transceiver that implements a wireless technology corresponding to the selected Wi-Fi subsystem used to transmit the one or more forward packets.

According to another exemplary aspect, an apparatus implementing the collaborative demand-based dual-mode Wi-Fi network control framework disclosed herein may comprise a first Wi-Fi subsystem having a first independent physical transceiver, a second Wi-Fi subsystem having a second independent physical transceiver, wherein the first Wi-Fi subsystem has a higher performance level than the second Wi-Fi subsystem, and one or more processors configured to calculate a bandwidth requirement associated with one or more forward packets to transmit from the apparatus, select either the first Wi-Fi subsystem or the second Wi-Fi subsystem based on at least the bandwidth requirement associated with the one or more forward packets and the performance levels associated with the first and second Wi-Fi subsystems, and utilize the independent physical transceiver associated with the selected Wi-Fi subsystem to transmit the one or more forward packets. Furthermore, in one embodiment, the one or more processors may be further configured to reserve the first Wi-Fi subsystem having the higher performance level to forward traffic that has one or more performance requirements that cannot be satisfied using a wireless technology associated with the second Wi-Fi subsystem, send one or more call-ahead signals to a connection manager configured to control the first Wi-Fi subsystem and the second Wi-Fi subsystem, wherein the one or more call-ahead signals instruct the connection manager to activate the selected Wi-Fi subsystem, and perform a service negotiation with a sink device intended to receive the one or more forward packets, wherein the service negotiation instructs the sink device to activate an independent physical transceiver that implements a wireless technology corresponding to the selected Wi-Fi subsystem used to transmit the one or more forward packets.

According to another exemplary aspect, an apparatus implementing the collaborative demand-based dual-mode Wi-Fi network control framework disclosed herein may comprise means for calculating a bandwidth requirement associated with one or more forward packets to transmit from the apparatus, wherein the apparatus includes at least a first Wi-Fi subsystem and a second Wi-Fi subsystem having independent physical transceivers, and wherein the first Wi-Fi subsystem has a higher performance level than the second Wi-Fi subsystem, means for selecting either a first Wi-Fi subsystem or a second Wi-Fi subsystem based on at least the bandwidth requirement associated with the one or more forward packets and the performance levels associated with the first and second Wi-Fi subsystems, and means for transmitting the one or more forward packets using the selected Wi-Fi subsystem.

According to another exemplary aspect, a computer-readable storage medium implementing the collaborative demand-based dual-mode Wi-Fi network control framework disclosed herein may have computer-executable instructions recorded thereon, wherein executing the computer-executable instructions on one or more processors may cause the one or more processors to calculate a bandwidth requirement associated with one or more forward packets to transmit from a source device that includes at least a first Wi-Fi subsystem and a second Wi-Fi subsystem having independent physical transceivers, and wherein the first Wi-Fi subsystem has a higher performance level than the second Wi-Fi subsystem, select either the first Wi-Fi subsystem or the second Wi-Fi subsystem based on at least the bandwidth requirement associated with the one or more forward packets and the performance levels associated with the first and second Wi-Fi subsystems, and transmit the one or more forward packets using the selected Wi-Fi subsystem.

Other objects and advantages associated with the various aspects and/or embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
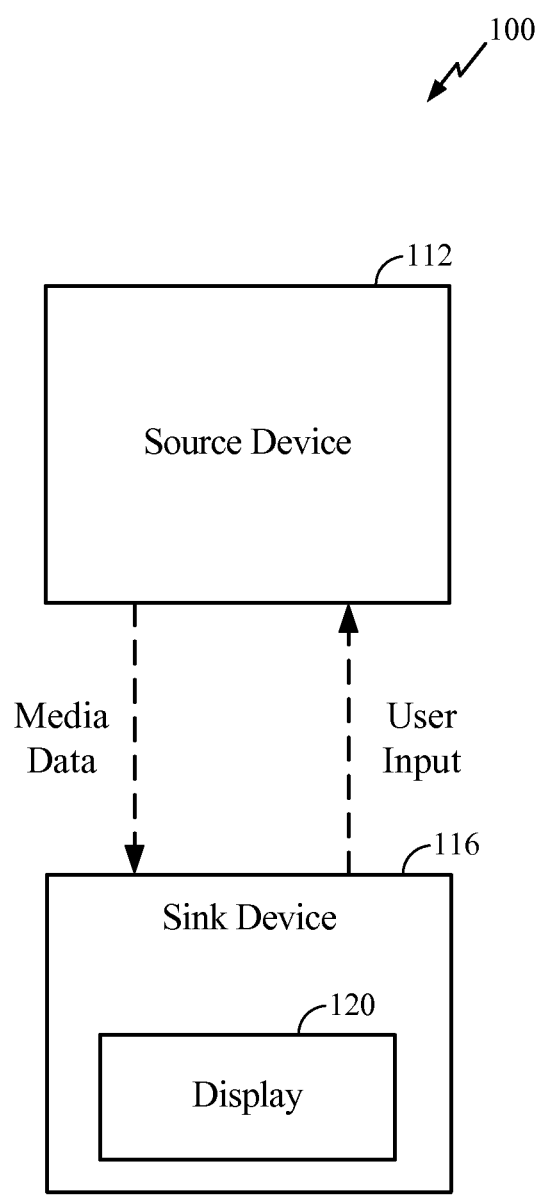
FIG. 1 illustrates an exemplary wireless docking system that includes a source device and a sink device, according to various aspects of the disclosure.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "wireless device" may refer to a mobile or stationary device, which may be interchangeably referred to as a "user equipment" or "UE," an "access terminal" or "AT," a "wireless communication device," a "subscriber device," a "subscriber terminal," a "subscriber station," a "user terminal" or "UT," a "mobile terminal," a "mobile station," and variations thereof. Furthermore, a wireless device as used herein can communicate over local or external networks such as the Internet using various suitable Wi-Fi networking technologies (e.g., based on the IEEE 802.11 standards), while a "dual-mode" wireless device may refer to a wireless device that can communicate using multiple Wi-Fi networking technologies, which may include the new directional 802.11ad standard in addition to conventional Wi-Fi technologies such as 802.11n or the new 802.11ac variance thereof. Accordingly, those skilled in the art will appreciate that wireless devices and dual-mode wireless devices can be embodied by any of a number of types of devices including but not limited to PC cards, compact flash devices, external or internal modems, wireless or wireline phones, and so on.

In general, this disclosure relates to a framework that may support collaborative demand-based dual-mode Wi-Fi network control to optimize power and performance on wireless devices that may support multiple Wi-Fi networking technologies, which may include the 802.11ad protocol that defines a new physical layer to allow wireless devices to communicate at multi-gigabit speeds, which may be especially well-suited to applications that high fidelity media data to be wirelessly rendered at a continuous high-throughput, such as a wireless dock platform that implements Miracast™ technology according to the Wi-Fi Display standard. More particularly, the collaborative demand-based dual-mode Wi-Fi network control framework disclosed herein may generally reserve a high performance Wi-Fi link (e.g., an 802.11ad link) only to services or applications that have substantial quality of service (QoS) requirements and utilize conventional Wi-Fi links such as 802.11n/802.11ac links to transfer data for services or applications that have typical performance requirements. For example, in various embodiments, Differentiated services (or "DiffServ") used to schedule and shape high throughput forward traffic may be further used to measure bandwidth requirements and send call-ahead signals to control the Wi-Fi networking mode. Furthermore, when no forward traffic needs to be transmitted, all Wi-Fi subsystems may be permitted to enter a sleep mode or other low power states. Accordingly, this disclosure sets forth various aspects and embodiments to detail how the collaborative demand-based dual-mode Wi-Fi network control framework may optimize power and performance associated with a source device used in a wireless dock system, wherein the source device may comprise a wireless device that generally processes all audio data and/or video data to be displayed or otherwise rendered at one or more sink devices and further processes user inputs that are received from the sink devices. However, those skilled in the art will appreciate that the description provided herein may be equally well-suited to any other applications that have high bandwidth, low latency, or other QoS requirements that require the ability to wirelessly communicate at high speeds.

According to one aspect of the disclosure, FIG. 1 illustrates an exemplary wireless dock system 100 that includes a source device 112 and one sink device 116. However, those skilled in the art will appreciate that the wireless dock system 100 may suitably more than one participating sink device in various exemplary embodiments. The wireless dock system 100 may also include one or more base stations (not shown) that support multiple Wi-Fi networks (e.g., IEEE 802.11x) over which a wireless media share session can be established between the source device 112 and the sink device 116. Furthermore, a communication service provider may centrally operate and administer one or more of these networks using a base station as a network hub.

According to the Wi-Fi Display standard, the source device 112 may receive a request from the sink device 116 to setup a media share session, wherein the source device 112 may establish the media share session between the source device 112 and the sink device 116 using the Real-Time Streaming Protocol (RTSP). Once the media share session has been established, the source device 112 may transmit media data (e.g., audio data, video data, and/or combinations thereof) to the participating sink device 116 using the Real-time Transport protocol (RTP). For example, the media data may be transmitted over the media share session using conventional Wi-Fi standards (e.g., 802.11n, 802.11ac, etc.) and/or using new directional and high-performance standards (e.g., 802.11ad). In any case, the sink device 116 may render the media data received from the source device 112 on a display 120 and/or audio equipment (not shown) associated therewith.

In one embodiment, a user may apply one or more user inputs on the sink device 116 (e.g., touch inputs via a touch-screen such as display 120, keyboard inputs, tracking ball or mouse inputs, remote control inputs, etc.). Furthermore, in certain cases, the user inputs applied at the sink device 116 may be sent to the source device 112 over a reverse channel architecture, which may be referred to as a user input back channel (UIBC). As such, the source device 112 may respond to the user inputs applied at the sink device 116, wherein the source device 112 may process the user inputs applied at and received from the sink device 116 and subsequently apply the user inputs on subsequent media data that the source device 112 may send to the sink device 116.

In various cases, the source device 112 and/or the sink device 116 may comprise wireless devices, which may include mobile telephones, portable computers with wireless communication cards, personal digital assistants (PDAs), portable media players, flash memory devices with wireless communication capabilities, including so-called "smart" phones and "smart" pads or tablets, and/or other suitable wireless devices. In other examples, the source device 112 and/or the sink device 116 may comprise wired devices that have wired and wireless communication capabilities, which may include televisions, desktop computers, monitors, projectors, and the like. Furthermore, in certain exemplary embodiments, the source device 112 and/or the sink device 116 may comprise similar devices (e.g., both may be smart phones, tablet computers, etc.), in which case one device may operate as the source device 112 and the other may operate as the sink device 116, and these roles may even be reversed in different use cases (e.g., in camera or camcorder applications where the multimedia data may be sourced in the opposite direction). Further still, in various embodiments, the display 120 on the sink device 116 may comprise a liquid crystal display (LCD), a plasma display, an organic light emitting diode (OLED) display, or another suitable display device.

In general, the wireless dock system 100 shown in FIG. 1 may be especially useful in providing convenient mechanisms to wirelessly connect the source device 112 and the sink device 116 that can create, receive, or otherwise render audio, video, and/or other multimedia data. Accordingly, a user may listen to audio data using the sink device 116, which may have speakers that are more powerful or otherwise produce better quality sound than the source device 112, view video data on the sink device 116, which may be a digital television or computer monitor having a large display 120 that can provide much higher resolution than a local display at the source device 112, and so on. However, in order to provide satisfactory user experience, the wireless dock system 100 may need to provide similar performance to a high-definition multimedia interface (HDMI) or other "wired" connection interfaces and sufficient throughput to exchange media data and user inputs between the source device 112 and the sink device 116 and thereby synchronize user interaction at the sink device 116 with the local display at the source device 112 and the multimedia data rendered on the display 120, speakers, and/or other output interfaces at the sink device 116 in a manner fast enough to provide seamless and quality user experience.

Furthermore, where the source device 112 and/or the sink device 116 comprise wireless devices, the wireless dock system 100 may further need to provide low power consumption to optimize battery life at the source device 112 and/or the sink device 116. For example, typical wireless use cases and applications employed in the wireless dock system 100 may include the above-mentioned bidirectional communication to stream audio, video, and/or other multimedia data from the source device 112 to the sink device 116 or vice versa, wherein to achieve the requisite service quality and user experience, encoding and actually transmitting the multimedia data via a wireless communication channel may require relatively high bit-rate encoding and transmission in a short time period, which can consume substantial battery power. However, other use cases and applications may have typical or less substantial throughput demands. For example, although described above in a wireless display or other multimedia streaming context, the wireless dock system 100 may further support remote user interface and sensing applications, in which case the source device 112 and/or the sink device 116 may comprise a sensor platform that can transmit or receive direct commands (e.g., key and button presses), environmental context information (e.g., temperature measurements), proximity or presence information (e.g., using a multi-band and/or multi-microphone array, photo detection, image sensors, haptic interfaces, pressure sensors, etc.), and positioning information (e.g., measurements obtained with a gyroscope, accelerometer, magnetometer, and/or other sensors that can indicate stability, vibration, orientation, heading, kinetics, etc.). In other examples, less demanding use cases and applications that may be supported in the wireless dock system 100 may include file transfer sessions, print screen requests, and/or other data transfers that can be adequately provided using wireless interfaces that consume less battery power. Moreover, simply operating a wireless interface may consume power even when no data transfers are active.

Accordingly, as mentioned above and as will be described in further detail below, the wireless dock system 100 may implement a collaborative demand-based wireless network control framework that may generally reserve a high performance wireless link (e.g., an 802.11ad Wi-Fi link) to services or applications that have substantial QoS requirements, while services or applications that have typical performance requirements and/or have sporadic low-latency requirements may utilize wireless links that offer lower performance than the high performance wireless link (e.g., 802.11n/802.11ac Wi-Fi links). Furthermore, when no forward traffic needs to be transmitted between the source device 112 and the sink device 116, all wireless subsystems associated therewith may enter a low power mode (e.g., a standby mode, a slotted sleep or deep sleep mode, etc.).

Figure 2:
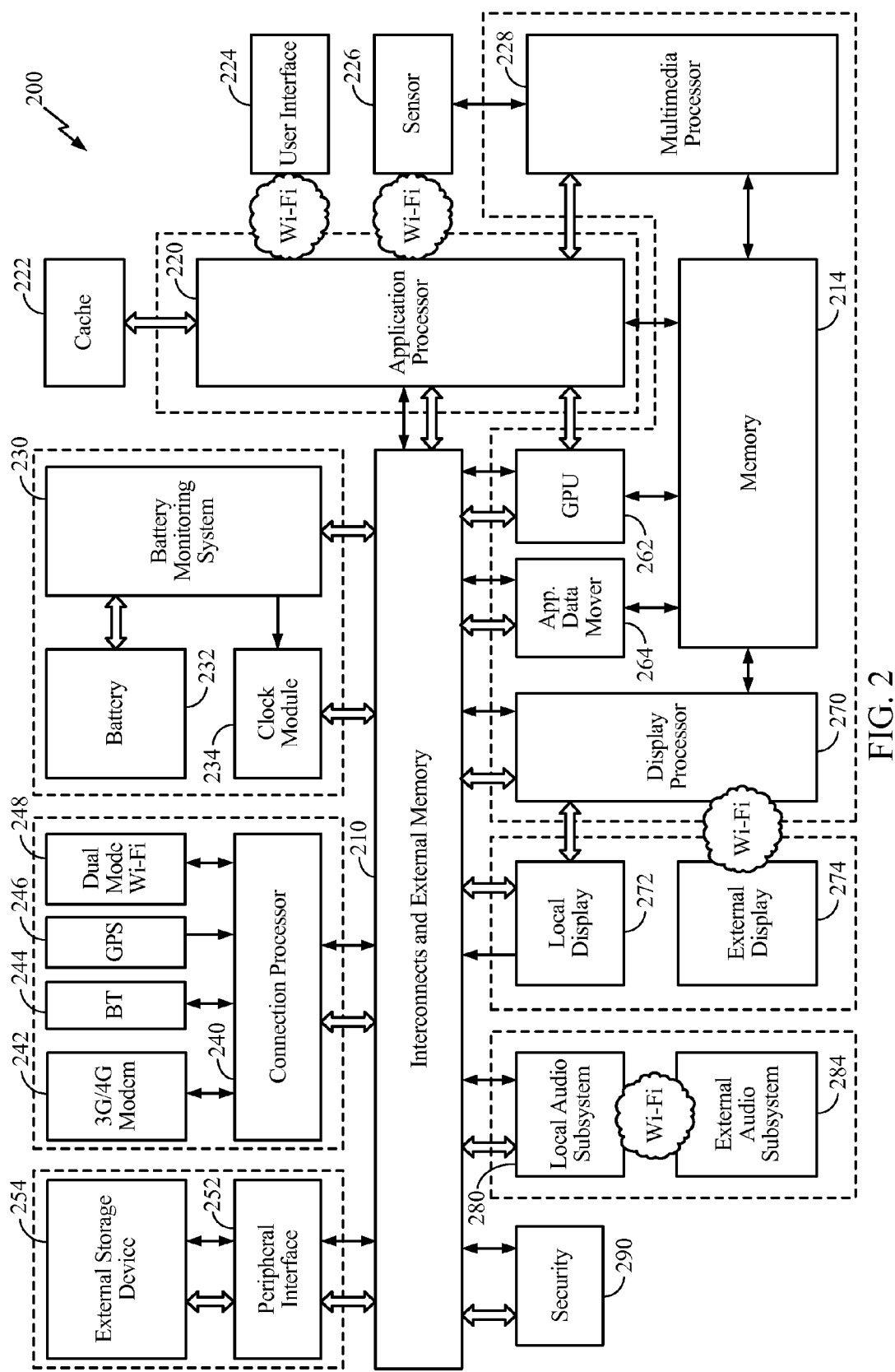
FIG. 2 illustrates a more detailed block diagram that may correspond to the exemplary source device shown in FIG. 1, according to various aspects of the disclosure.

According to various aspects of the disclosure, FIG. 2 illustrates a block diagram corresponding to an exemplary wireless device 200 that may be used in a wireless dock system, wherein the wireless device 200 shown in FIG. 2 may correspond to the source device 112 and/or the sink device 116 shown in FIG. 1. In one embodiment, as shown in FIG. 2, the wireless device 200 may include a display processor 270 that can encode or otherwise process video data to present on a local display 272 and/or an external display 274 on an external device (e.g., the sink device 116 shown in FIG. 1). In certain use cases, the display processor 270 may process the same video data to display on both the local display 272 and the external display 274, or the display processor 270 may alternatively only process video data to display on either the local display 272 or the external display 274. In a similar respect, the wireless device 200 may include a local audio subsystem 280 that can process audio data to present through local audio output mechanisms (e.g., internal speakers, a headphone interface, etc.) and/or an external audio subsystem 284 on the external device, wherein the local audio subsystem 280 may process the same audio data to present locally and through the external audio subsystem 284 or alternatively only process audio data to present locally or through the external audio subsystem 284.

For example, the wireless device may include a connection processor 250, which may be dedicated to communication purposes or included in a general-purpose processor associated with the wireless device 200, wherein the connection processor 250 may manage a 3G/4G cellular modem 242, a Bluetooth (BT) radio 244, a global positioning system (GPS) 246 receiver, and a dual-mode Wi-Fi module 248 in addition to any other modules and/or units that the wireless device 200 may use to communicate over wired or wireless interfaces. Furthermore, as noted above, the dual-mode Wi-Fi module 248 may include at least an independent high performance Wi-Fi transceiver (e.g., an 802.11ad transceiver) and an independent Wi-Fi transceiver that operates according to conventional Wi-Fi protocols (e.g., an 802.11n/802.11ac transceiver). Accordingly, in situations where the display processor 270 and/or the local audio subsystem 280 process video and/or audio data to render on the external device, the video and/or audio data may be transmitted using the high performance Wi-Fi transceiver in order to provide the bandwidth and other QoS demands that may be required to provide high-definition rendering or using the conventional Wi-Fi transceiver if the video and/or audio data relates to an application that can be adequately serviced using typical Wi-Fi performance.

In one embodiment, the wireless device 200 may further include an external storage device 254 coupled to an interconnect 210 through a peripheral interface 252, wherein data stored in the external storage device 254 may comprise a flash drive, a Universal Serial Bus (USB) drive, an SD card, or any other suitable external storage device. In addition, data stored in the external storage device 254 may be received from storage or in real-time from a private network or a public network (e.g., the Internet) via the connection processor 240. In one embodiment, the wireless device 200 may further include an application data mover 264 that may move data from the external storage device 254 to local memory 214 such that an application processor 220 executing one or more applications can access the data more easily. Furthermore, the application processor 220 may include a cache 222 to store frequently accessed data. In addition, the wireless device 200 may include a graphics processing unit 262 that can perform any suitable graphics processing that applications running on the application processor 220 may require. Furthermore, the wireless device 200 may include one or more multimedia processors 228 that can provide encoding, decoding, acceleration, and/or other multimedia processing on multimedia content obtained from network sources (e.g., the Internet), from sensors in the wireless device 200 (e.g., a built-in camera) and/or an external sensor platform 226, and/or any other suitable multimedia source. Furthermore, to present media data on the external sink device, the wireless communication device 200 may include a security module 290 that may determine and apply any security information necessary to ensure that media data packets are securely transmitted to the external sink device (e.g., content protection).

Additionally, the wireless device 200 may include a battery monitoring system 230, which may monitors the status associated with a battery 232 in the wireless device 200. For example, in one embodiment, the battery monitoring system 230 may store status information that reflects whether the wireless device 200 may be using a wall-plugged power source or the internal battery 232, and if using the internal battery 232, the remaining power available thereon. In some cases, the status information relating to the battery 232 may be presented on the local display 280 (e.g., using a small battery icon, lights or sounds to indicate different battery conditions, etc.). In general, the battery monitoring system 230 may update the status information associated with the battery 232 almost continuously to reflect an accurate battery status to the user. In addition, the battery monitoring system 230 may control a clock module 234 that includes various clocks and/or other suitable circuitry used to control functions performed in the wireless device 200. Furthermore, as noted above, the dual-mode Wi-Fi module 248 may include multiple independent Wi-Fi transceivers that can offer different performance levels. However, the different performance levels may have different impacts on the battery 232, wherein the high-performance Wi-Fi transceiver may generally consume more power. As such, the wireless device 200 may implement a collaborative demand-based Wi-Fi network control framework that may optimize power consumption according to performance requirements associated with applications running thereon, as will be described in further detail below.

Figure 3:
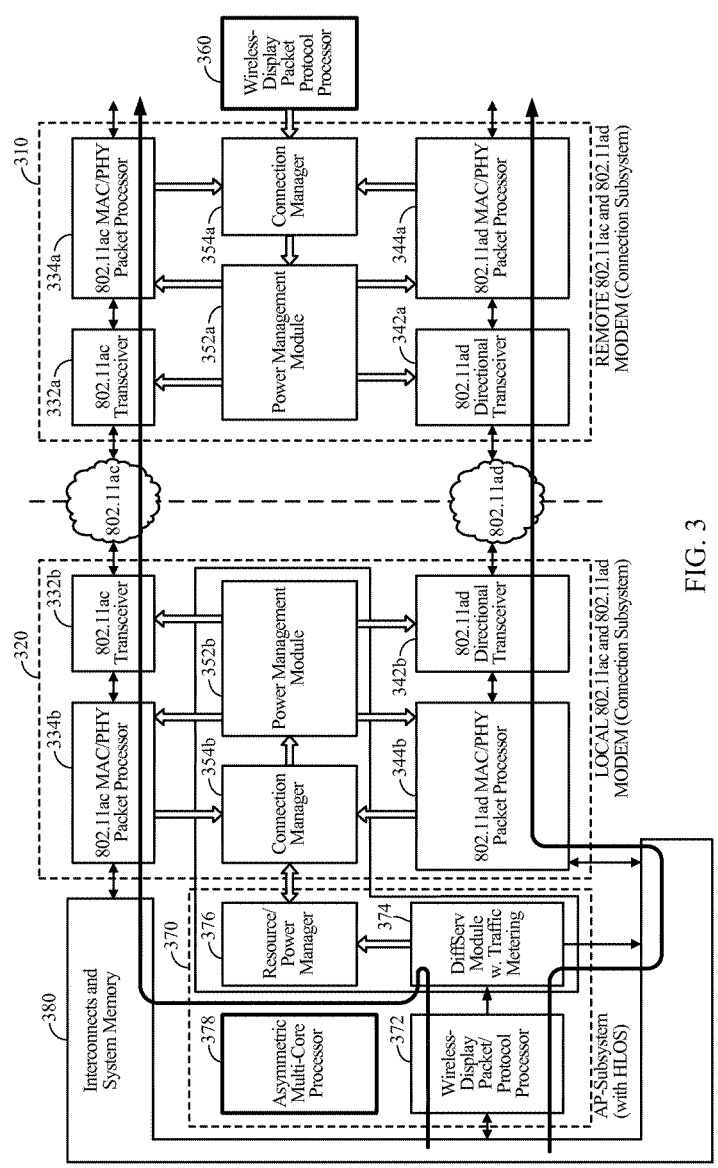
FIG. 3 illustrates an exemplary dual-mode Wi-Fi networking data path that may be used in a wireless docking system, according to various aspects of the disclosure.

According to various aspects of the disclosure, FIG. 3 illustrates an exemplary dual-mode Wi-Fi networking data path that may include wireless communication between a source device 320 and a sink device 310 in a wireless docking system. In particular, in order to transmit data intended to be rendered at the sink device 310, a wireless display packet/protocol processor 372 at the source device 320 may receive the data from an interconnect and system memory subsystem 380 after any initial processing has been completed, wherein the wireless display packet/protocol processor 372 may then process and encode the data intended to be rendered at the sink device 310. The processed and encoded data may then be provided to a collaborative Differentiated services ("DiffServ") module 374, which may inspect the content associated with the encoded data in order to classify, manage, schedule, and otherwise shape network traffic associated therewith based on any applicable bandwidth, latency, or other QoS requirements. For example, the collaborative DiffServ module 374 may generally use a six-bit DiffServ code point (DSCP) in an eight-bit DiffServ field in an Internet Protocol (IP) header to classify forward packets to be transmitted and place the outgoing forward packets into various traffic classes that may be managed differently such that high-priority traffic may receive preferential treatment (e.g., classifying streaming media, voice, or other critical network traffic having substantial performance requirements into a low-latency traffic class while providing simple best-effort service to web traffic, file transfers, or other non-critical services).

Accordingly, in order to schedule and shape the forward traffic, the collaborative DiffServ module 374 may select an appropriate Wi-Fi technology to use in order to transmit the forward traffic to the sink device 310 according to bandwidth, latency, or other QoS requirements associated therewith. In particular, the collaborative DiffServ module 374 may implement traffic metering and send one or more call-ahead signals to a resource manager 376, which may then relay the call-ahead signals to the connection manager 354b on the source device 320 and thereby control the applicable Wi-Fi networking mode. In particular, as noted above, the source device 320 may include a high-performance Wi-Fi subsystem having an 802.11ad MAC/PHY packet processor 344b and associated 802.11ad directional transceiver 342b and a conventional Wi-Fi subsystem having a MAC/PHY packet processor 334b and associated 802.11n/801.11ac transceiver 332b. As such, the call-ahead signals that originate from the collaborative DiffServ module 374 may generally instruct the connection manager 354b to activate the high-performance Wi-Fi subsystem and/or the conventional Wi-Fi subsystem depending on the traffic classes associated with the outgoing forward traffic, wherein the connection manager 354b may send appropriate instructions to a power management module 352b that then activates or deactivates the applicable Wi-Fi subsystem. In particular, the call-ahead signals may instruct the connection manager 354b to activate the high-performance Wi-Fi subsystem only when the outgoing forward traffic includes packets with high bandwidth, low latency, or other QoS requirements, while all other outgoing forward traffic may be transmitted using the conventional Wi-Fi subsystem. Furthermore, when no outgoing forward traffic exists, the call-ahead signals may indicate that the high-performance Wi-Fi subsystem and the conventional Wi-Fi subsystem can both be placed into a low power mode.

Additionally, in order to coordinate communication between the source device 320 and the sink device 310 intended to receive the forward traffic, a dual-mode Wi-Fi service negotiation may occur therebetween to ensure that the appropriate Wi-Fi subsystems are activated on the sink device 310 and/or to indicate that the sink device 310 may deactivate one or both Wi-Fi subsystems when no outgoing forward traffic needs to be sent. To that end, the sink device 310 may include substantially similar components to the source device 320 in order to place the respective Wi-Fi subsystems into the appropriate sates.

Figure 4:
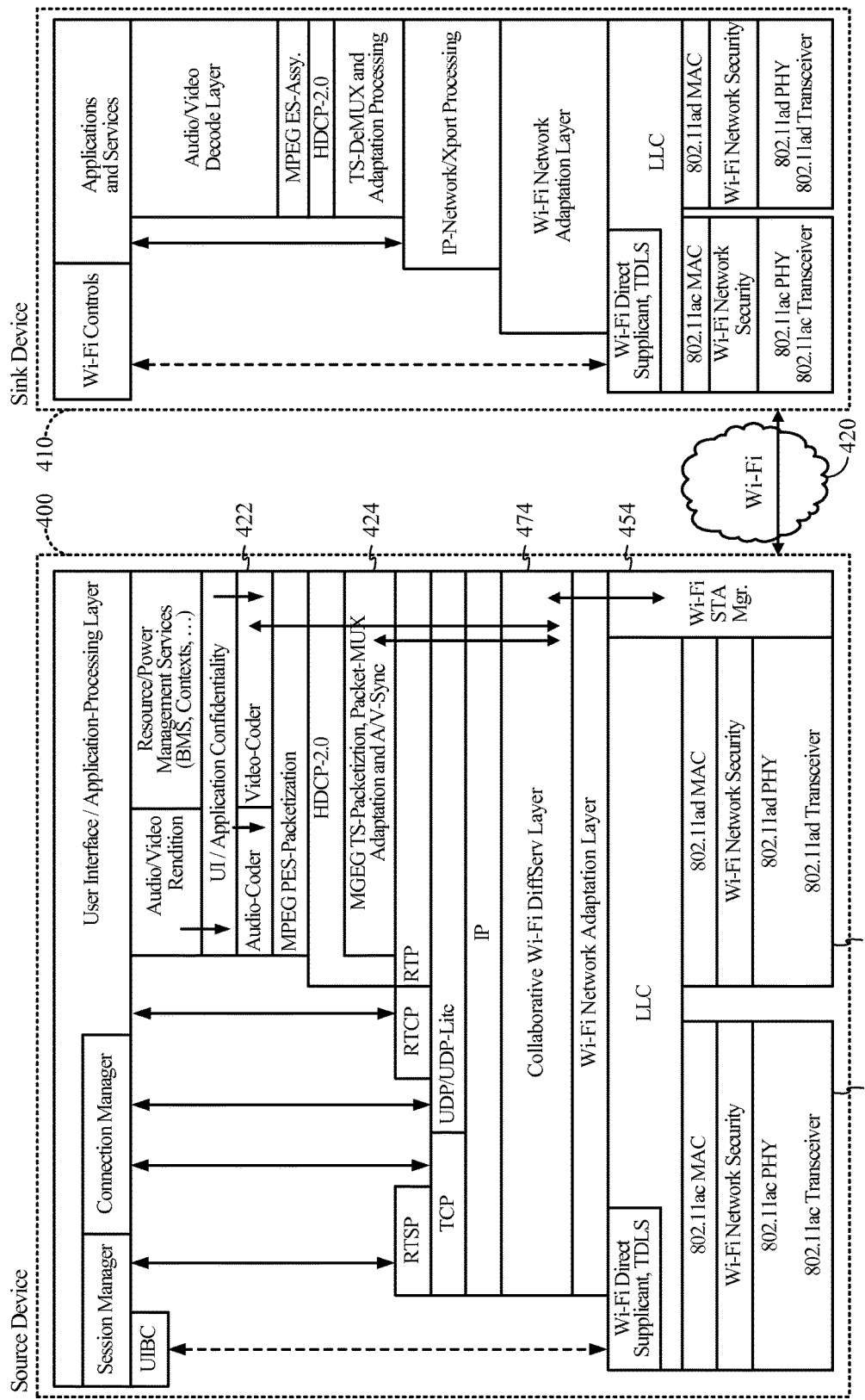
FIG. 4 illustrates an exemplary data communication model or protocol stack that may provide collaborative and demand-based dual-mode Wi-Fi network control in a wireless docking system, according to various aspects of the disclosure.

According to various aspects of the disclosure, FIG. 4 illustrates an exemplary data communication model or protocol stack that may provide collaborative and demand-based dual-mode Wi-Fi network control in a wireless docking system, wherein the data communication model shown in FIG. 4 may illustrate various interactions between data and control protocols used to transmit data between a source device 400 and a sink device 410 over a Wi-Fi connection 420 in a wireless dock system.

In one embodiment, as shown in FIG. 4, the source device 400 may include a physical (PHY) layer and a media access control (MAC) layer that may define physical signaling, addressing, and channel access control used in a wireless dock system. Furthermore, the PHY and MAC layers may define the frequency band structure used for communication (e.g., Federal Communications Commission bands defined at 2.4 GHz, 3.6 GHz, 5 GHz, 60 GHz, Ultrawideband (UWB) frequency band structures, etc.), data modulation techniques (e.g., analog and digital amplitude modulation, frequency modulation, phase modulation techniques, etc.), and multiplexing techniques (e.g., orthogonal frequency division multiplexing (OFDM), time division multi access (TDMA), frequency division multi access (FDMA), code division multi access (CDMA), etc.), among other things. In one exemplary embodiment, the PHY and MAC layers may support multiple Wi-Fi modes using a Wi-Fi subsystem having an 802.11ac transceiver 432 and a separate Wi-Fi subsystem having an 802.11ad transceiver 442. In particular, the IEEE 802.11ac standard was designed to build on the IEEE 802.11n standard and include wider channels in the 5 GHz band (e.g., 80 or 160 MHz versus 40 MHz), more spatial streams (up to eight versus four), higher order modulation (up to 256-QAM versus 64-QAM), and Multi-user Multiple-Input Multiple-Output (MU-MIMO). On the other hand, the IEEE 802.11ad (or "WiGig") standard defined a new physical layer to allow 802.11 networks to operate in the 60 GHz millimeter wave spectrum, which has significantly different propagation characteristics than the 2.4 GHz and 5 GHz bands in which Wi-Fi networks typically operate. As such, the 802.11ad Wi-Fi subsystem may support a peak transmission rate around 7 Gbit/s, which may be especially advantageous when the source device 400 and the sink device 410 communicate over the Wi-Fi connection 420 to establish a media share session that involves communication associated with applications and/or services having high performance requirements or other suitable QoS requirements (e.g., wireless data, display, audio, etc.). However, as mentioned above, many use cases and/or applications may have less demanding throughput requirements that can be adequately provided when the Wi-Fi connection 420 uses the conventional 802.11ac Wi-Fi subsystem.

Accordingly, the source device 400 may include a collaborative Wi-Fi DiffServ layer 474 that may classify forward packets to be transmitted to the sink device 410 into various traffic classes that may be managed differently such that high-priority traffic may receive preferential treatment. In particular, the collaborative Wi-Fi DiffServ layer 474 may send one or more call-ahead signals to a Wi-Fi station manager (or connection manager) 454 to indicate the appropriate Wi-Fi subsystem to use in order to transmit the forward traffic, wherein the Wi-Fi station manager 454 may then activate or deactivate the 802.11ac Wi-Fi subsystem and/or the 802.11ad Wi-Fi subsystem according to the call-ahead signals received from the collaborative Wi-Fi DiffServ layer 474. In that context, the collaborative Wi-Fi DiffServ layer 474 may reside above a logical link control (LLC) layer and below network and transport processing layers, wherein the LLC layer may provide multiplexing mechanisms to allow various network protocols to coexist within a multi-point network and be transported over the same network medium in addition to flow control and automatic repeat request (ARQ) error management mechanisms, while the network and transport processing layers may include an Internet Protocol (IP) layer, a transport control protocol (TCP) layer, a user datagram protocol (UDP)/UDP-Lite layer, a real time streaming protocol (RTSP) layer, a real time control protocol (RTCP) layer, and a real time protocol (RTP) layer that may collectively define packet structures and encapsulations used in a wireless dock system according to standards maintained by the Internet Engineering Task Force (IETF). Furthermore, the RTSP layer may be used to negotiate capabilities, establish a session, and maintain or otherwise manage a session between the source device 400 and the sink device 410, wherein the source device 400 and the sink device 410 may establish the feedback channel using an RTSP message transaction to negotiate capabilities to support the feedback channel and feedback input category on the User Interface Back Channel (UIBC). For example, in one embodiment, the source device 400 may send a capability request message to the sink device 410 specifying capabilities of interest to the source device 400, which may include the particular Wi-Fi subsystems supported on the sink device 410 (e.g., one or more Wi-Fi subsystems that are not supported on the sink device 410 may simply be deactivated to avoid unnecessary battery consumption and processing overhead).

Furthermore, in one embodiment, the collaborative Wi-Fi DiffServ layer 474 may communicate with a video coder 422, which may define techniques used to code rendered video received from an audio/video rendition component in a wireless dock system. For example, the video coder 422 may implement various video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264, and may further render either compressed or uncompressed video data. Likewise, the collaborative Wi-Fi DiffServ layer 474 may communicate with an MPEG2 Transport Stream (MPEG-TS) packetization layer 424, which may define how coded audio and video data will be packetized and transmitted. Furthermore, the MPEG-TS packetization layer 424 may be implemented within a content protection layer that protects against unauthorized audio and/or video data copying according to the High bandwidth Digital Content Protection (HDCP) 2.0 specification. The audio coder may define the audio data coding techniques used in the wireless dock system, wherein audio data may be coded using multi-channel formats (e.g., Dolby and Digital Theater System formats), compressed formats (e.g., MPEG-1, 2 Audio Layers II and III, AC-3, AAC), or uncompressed formats (e.g., pulse-code modulation (PCM)).

Accordingly, in response to receiving processed and encoded data to be rendered at the sink device 410 from the video coder 422, the MPEG TS packetization layer 424, the audio coder, and/or other suitable upper layers in the data communication model, the collaborative Wi-Fi DiffServ layer 474 may inspect the content associated with the encoded data and then classify, manage, schedule, and otherwise shape network traffic associated therewith based on any applicable bandwidth, latency, or other QoS requirements. For example, the collaborative Wi-Fi DiffServ layer 474 may insert information into an IP packet header to classify forward packets and place the outgoing forward packets into various traffic classes that are managed differently. For example, the forward packets may be placed into a traffic class associated with the 802.11ac Wi-Fi subsystem or the 802.11ad subsystem such that the Wi-Fi station manager 454 may activate the appropriate Wi-Fi subsystem depending on the traffic classes associated with the outgoing forward traffic.

Figure 5:
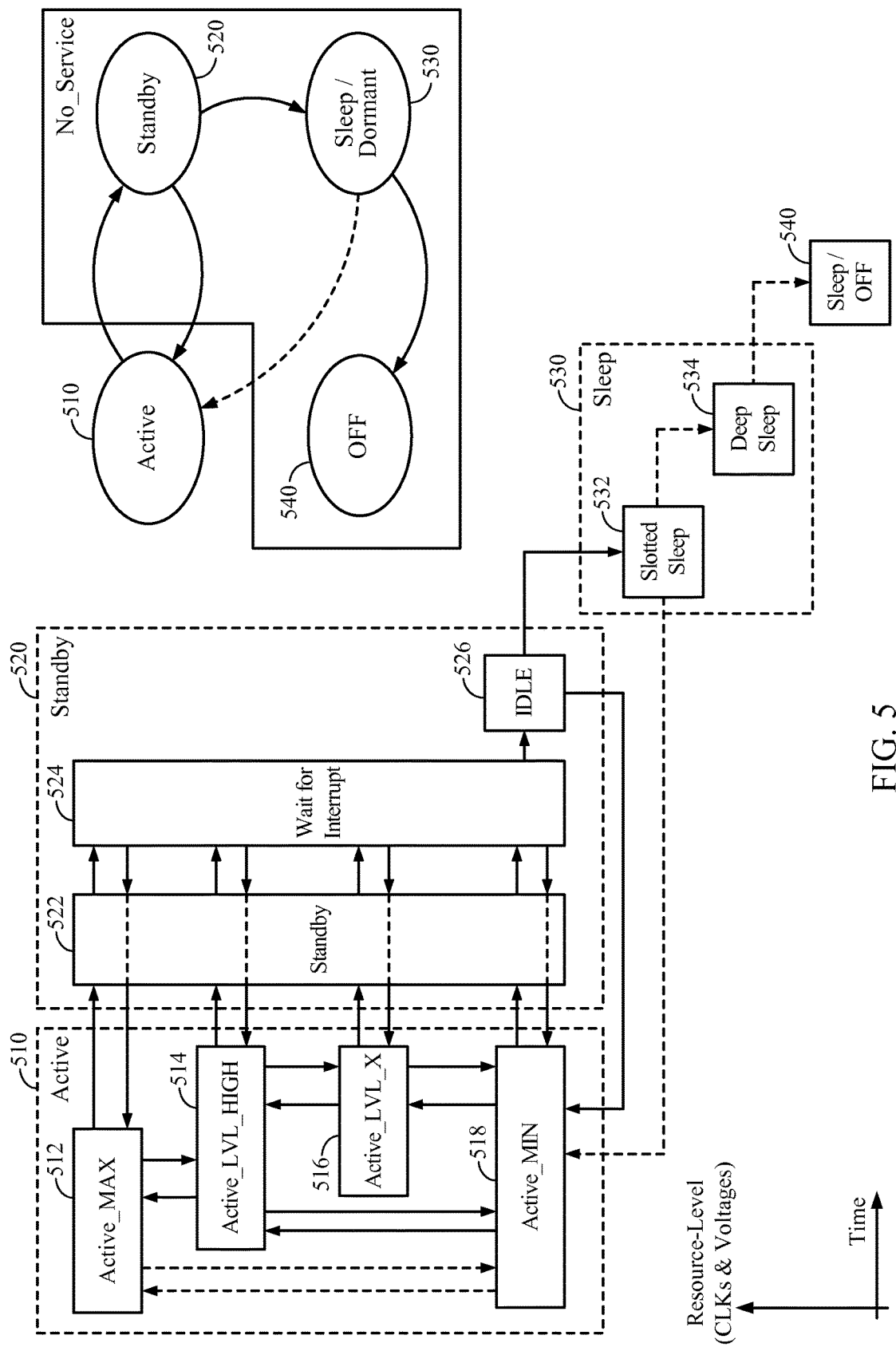
FIG. 5 illustrates an exemplary power state diagram and related taxonomy associated with a wireless device supporting dual-mode Wi-Fi networking technologies, according to various aspects of the disclosure.

According to various aspects of the disclosure, FIG. 5 illustrates an exemplary power state diagram and related taxonomy associated with a wireless device supporting dual-mode Wi-Fi networking technologies. For example, the power state diagram may represent various power states associated with a source device and/or a sink device that may have multiple Wi-Fi subsystems, which may include an 802.11ac subsystem and an 802.11ad subsystem. In particular, when the source device and the sink device are sending and receiving data during a media share session, the source device and the sink device may have an active power state 510. Furthermore, in one embodiment, the active state 510 may have several sub-states that represent different operating states associated with the multiple Wi-Fi subsystems supported thereon. For example, when exchanging data using both the 802.11ac subsystem and the 802.11ad subsystem, the source device and the sink device may be operating in an Active_MAX sub-state 512 that may consume substantial power because all Wi-Fi subsystems are currently active. However, the source device and the sink device may be operating in an Active_LVL_HIGH sub-state 514 when only the 802.11ad subsystem is in use or an Active_LVL_LOW sub-state 516 when only the 802.11ac subsystem is in use. In particular, the Active_LVL_HIGH sub-state 514 may generally consume more power than the Active_LVL_LOW sub-state 516 because the 802.11ad subsystem may have more substantial power demands than the 802.11ac subsystem, and the Active_LVL_HIGH sub-state 514 and the Active_LVL_LOW sub-state 516 may each consume less power than the Active_MAX sub-state 512 because only one Wi-Fi subsystem is in use at a time. Furthermore, during periods when the source device and the sink device are not actively exchanging data, but before a predefined inactivity period expires, neither Wi-Fi subsystem may be in use and as such the source device and the sink device may operate in an Active_MIN sub-state 518 that consumes the least power among the various active sub-states during such periods.

In one embodiment, after the inactivity period associated with the active state 510 expires, no service may be active and the source device and the sink device may therefore transition to a standby state 520, wherein the standby state 520 may similarly have multiple sub-states. In particular, the standby state 520 may have an initial standby sub-state 522 in which the various Wi-Fi subsystems may suspend radio activity after the predefined inactivity period expires and periodically wake up to determine whether any transmit and/or receive traffic has been queued, wherein a transition back to the active state 510 may occur in response to determining that queued transmit and/or receive traffic exists. Furthermore, the standby state 520 may have a wait-for-interrupt (WFI) sub-state 524 in which radios, clocks, and/or other circuitry may be turned off until an interrupt event occurs, wherein a transition to the WFI sub-state 524 may occur after a predefined inactivity period passes while in the initial standby sub-state 522. In the WFI sub-state 524, interrupt events to wake up the appropriate Wi-Fi subsystem (e.g., to trigger a transition to the initial standby sub-state 522, the Active_MIN sub-state 518, etc.) may include an infrastructure element (e.g., an access point)

sending a message to indicate that forward traffic is queued and ready for transmission, a user-initiated event (e.g., interaction with an application that requires network communication), or other suitable events, as will be apparent to those skilled in the art. Moreover, in one embodiment, the standby state 520 may have an idle (or low power) sub-state 526 in which no new transactions will be accepted unless the Wi-Fi subsystem transitions back to the active state 510.

In one embodiment, after a Wi-Fi subsystem has transitioned to and remained in the standby state 520 without having any transmit or receive traffic for a certain inactivity period, a further transition to a sleep or "dormant state 530 may occur (e.g., from the idle sub-state 526). In particular, the sleep state 530 may include a slotted sleep sub-state 532 in which substantially all electronics associated with the inactive Wi-Fi subsystem may be turned off and the device may periodically wake (e.g., on every slot cycle) to check for pages on a paging channel, whereby the slotted sleep sub-state 532 may consume very little battery power because substantially all electronics are turned off most of the time. In one embodiment, after a further inactive period, the Wi-Fi subsystem may transition from the slotted sleep sub-state 532 to a deep sleep sub-state 534 in which clock generators may be turned off, cache coherency may not be maintained, and voltage may be reduced below a minimum operating voltage while preserving certain states such that a transition back to the active state 510 may occur when transmit and/or receive activity resumes. Eventually, after a further inactivity period expires while in the deep sleep sub-state 534, the sleeping Wi-Fi subsystem may transition to an off state 540, wherein the only battery power consumed in the off state 540 may be due to leakage current. However, transitioning out of the off state 540 may take a relatively long time, whereby a substantial inactivity period may be defined to trigger the transition to the off state 540 to prevent power saving measures from reducing performance and increasing latency due to the long wakeup period.

Figure 6:
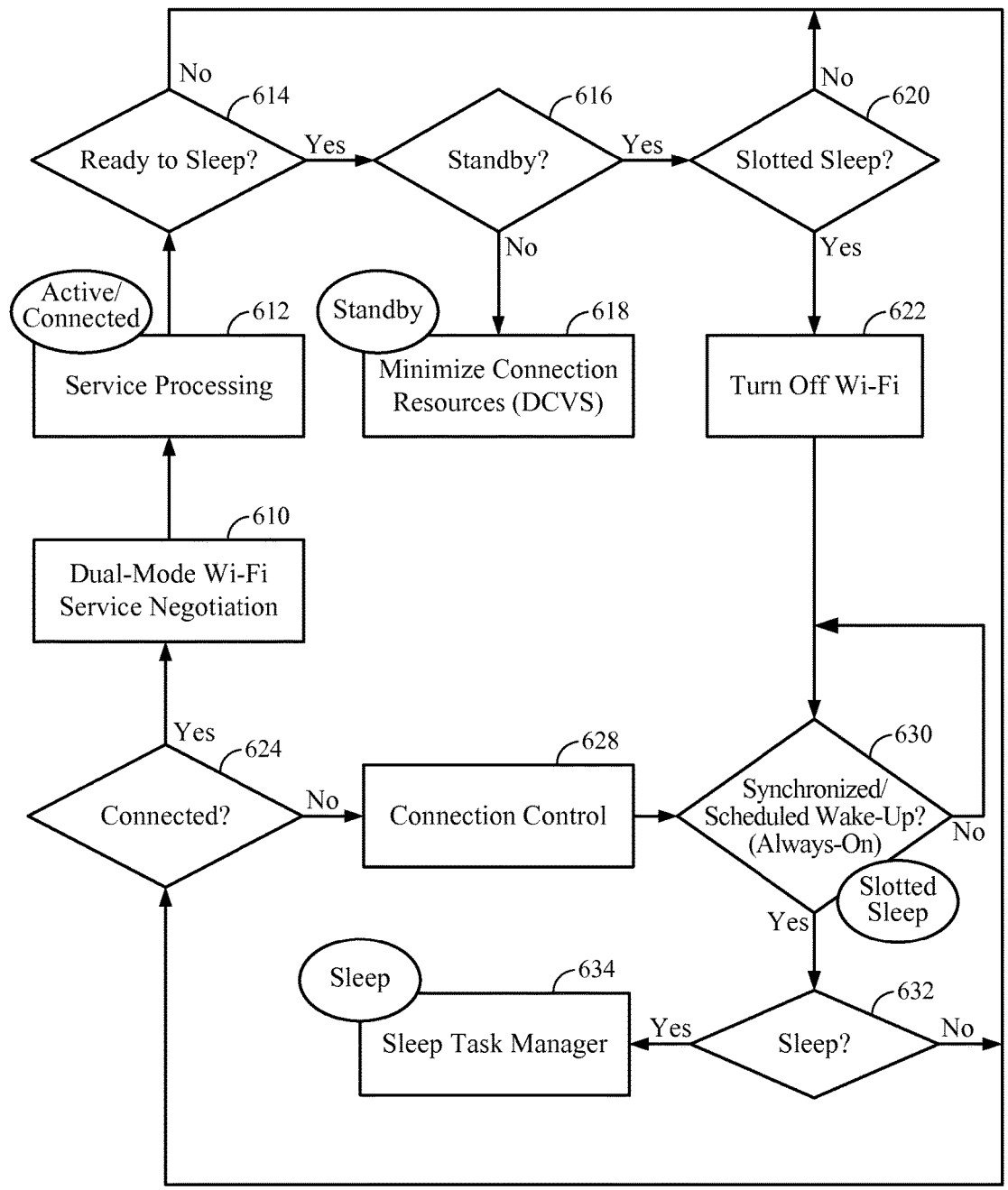
FIG. 6 illustrates an exemplary method that may control transitions between various power states in a wireless device supporting dual-mode Wi-Fi networking technologies, according to various aspects of the disclosure.

According to various aspects of the disclosure, FIG. 6 illustrates an exemplary method that may control transitions between various power states in a wireless device supporting dual-mode Wi-Fi networking technologies. In general, a Wi-Fi station manager may perform the method shown in FIG. 6 to control the transitions between the various power states in multiple Wi-Fi subsystems, which may include an 802.11ac subsystem and an 802.11ad subsystem, wherein the Wi-Fi station manager may be located in a source device, a sink device, a docking station, or any other suitable platform in a wireless dock system that can control the connection components associated with the multiple Wi-Fi subsystems. For a Wi-Fi station manager integrated into a source device or a sink device, the Wi-Fi station manager component may control the power state transitions associated with each Wi-Fi subsystem according to the method shown in FIG. 6. For example, in one embodiment, the Wi-Fi station manager may send wake and sleep commands to the Wi-Fi subsystems at periodic intervals to control the power state transitions.

Accordingly, in one embodiment, the Wi-Fi station manager may initially perform a dual-mode Wi-Fi service negotiation at block 610, which may include determining whether each respective Wi-Fi subsystem has any queued transmit and/or receive traffic. When one or more Wi-Fi subsystems have queued traffic ready to transmit and/or receive, the appropriate Wi-Fi subsystems may then be instructed to enter a service processing state at block 612, wherein the service processing state may generally correspond to an active or connected state in which the queued transmit and/or receive traffic may be processed. In one embodiment, the Wi-Fi station manager may then determine whether the Wi-Fi subsystem may be ready to enter a sleep state at block 614, which may include determining whether additional transmit and/or receive traffic has been queued and/or an inactivity time since the last transmit and/or receive traffic was processed. As such, if additional transmit and/or receive traffic has been queued or alternatively if the time since the last transmit and/or receive traffic was processed does not exceed a predefined inactivity timer, the station manager may determine whether the Wi-Fi subsystem is in the connected state at block 624, in which case the method may loop back to block 610.

Alternatively, in response to determining that the Wi-Fi subsystem is not connected at block 624, the station manager may initiate a connection control procedure at block 628. For example, in one embodiment, the station manager may determine whether the Wi-Fi subsystem has an Always-On configuration at block 630, wherein the Wi-Fi subsystem may be instructed to enter a slotted sleep state until a synchronized or scheduled wake-up occurs if the Wi-Fi subsystem does not have an Always-On configuration. Otherwise, if the Wi-Fi subsystem does not have an Always-On configuration, the station manager may determine whether to transition the Wi-Fi subsystem to a sleep state at block 632, in which case a sleep task manager may be invoked at block 634 and the Wi-Fi subsystem may enter a sleep or off state. However, if the station manager determines that the Wi-Fi subsystem should not be transitioned to the sleep state, the method may loop back to block 624 and the connection control procedure may be repeated until the Wi-Fi subsystem transitions to the connected state or the sleep state, as may be appropriate.

In one embodiment, returning to block 614, the station manager may determine that the Wi-Fi subsystem may be ready enter a sleep state if no further transmit and/or receive traffic has been queued and the time since the last transmit and/or receive traffic was processed exceeds the predefined inactivity timer. In that case, the station manager may determine whether the Wi-Fi subsystem is in a standby state at block 616, and instruct the Wi-Fi subsystem to minimize connection resources at block 618 and thereby reduce power consumption while maintaining the connection in response to determining that the Wi-Fi subsystem is not in the standby state. In one embodiment, the station manager may then determine whether there is any transmit and/or receive traffic that requires service processing at block 612 and either instruct the Wi-Fi subsystem to transition back to the active state or determine whether to enter a lower power state based on the existing traffic. Alternatively, in response to determining that the Wi-Fi subsystem is already in the standby state at block 616, the station manager may then determine the Wi-Fi subsystem is in a slotted sleep state at block 620. If not, the station manager may then determine whether the Wi-Fi subsystem is connected at block 624 and initiate the connection control procedure at block 628 in a similar manner to that described above (e.g., to cause the Wi-Fi subsystem to enter the slotted sleep state at block 630). However, if the station manager determines that the Wi-Fi subsystem is already in the slotted sleep state at block 620, the station manager may turn the Wi-Fi subsystem off at block 622 and then determine whether a synchronized or scheduled wake up event has occurred at block 630, wherein the method may then proceed in a similar manner to that described above.

In one embodiment, when operating according to the method shown in FIG. 6, the station manager may send sleep commands to the Wi-Fi subsystem to minimize connection resources or otherwise reduce active radio functions and thereby conserves battery power. In periodic intervals, the station manager may send a wake command to the Wi-Fi subsystem in order to activate the radio functions such that the Wi-Fi subsystem may listen for beacon messages from other Wi-Fi enabled devices. In one embodiment, the periodic intervals may coincide with a target beacon transmit time or a time in which another Wi-Fi enabled device would be expected to send a beacon message. Once a beacon message has been received, the radio functions may be allowed to remain active until a beacon message is not received for a predefined time period (e.g., 1000 milliseconds). If the station manager does not receive a beacon message or data before the predefined time period expires, the station manager may send a sleep command to the Wi-Fi subsystem to conserve battery power. Alternatively, if the station manager receives a stay awake command, the station manager may allow the Wi-Fi subsystem to remain active indefinitely until a release command is received from a source that sent the stay awake request (e.g., another Wi-Fi enabled device). Furthermore, the station manager may perform various other functions when carrying out the method shown in FIG. 6, which may include:

Passive Scanning: listening for beacon frames without transmitting;

Active-Scanning: sending probe request and probe response frames on each channel;

Listen/Search: discovering devices and/or services, requesting and/or responding to invitations, and forming groups (e.g., standard, autonomous, persistent, etc.);

Association Control: associations may be invoked the first time a station enters a network, reassociations may be requested when information from previous associations are included, join/connect and roaming among infrastructure or ad-hoc networks, peer-to-peer or Wi-Fi Direct connections, etc.;

Synchronization: access points and/or group owners regularly transmit beacons to enable other stations to receive timestamps to maintain an asynchronous local timer;

Coordination: contention resolution and avoidance, DCF/PCF/HCF coordination, backoff coordination, and slot scheduling;

Service Management: aggregation, DiffServ control, admission control, bandwidth reservation, link adaptation, etc.; and Power Management: entering low power states in a manner that may balance tradeoffs between power savings and disruptions to access points and/or group owners due to absence adding potential exit latency to a datapath in a wireless dock system.

Furthermore, in one embodiment, each Wi-Fi subsystem implemented on a particular source device or sink device in a wireless dock system may support various power saving functions, which may include:

Constantly-Awake-Mode (CAM): all power-saving features are disabled to avoid hindering throughput;

Wake-on-Wi-Fi: similar to wake-on-LAN, which allows the infrastructure to initiate waking up stations in low power states;

Power-Save-Mode: allows a node to enter a low power state after a variable predefine inactivity period and regularly wake up to listen and reconnect as needed;

Unscheduled-Automatic-Power-Save-Delivery (U-APSD): may require an access point operating in CAM to queue traffic associated with a station in a low power state such that the station can asynchronously request the queued traffic upon waking up;

WMM Power-Save-Mode (WMM-PSM): the access point buffers all unicast, broadcast and multicast traffics, the station informs the access point when entering a low power state and upon waking up from the low power state, the access point uses flags to inform the station when queued unicast traffic exists, and the access point sends the queued unicast traffic to the station during the wakeup procedure or upon request, and the access point sets a special flag when sending broadcast/multicast traffic;

Synchronous-Automatic-Power-Save-Delivery (S-APSD): similar to WMM-PSM except scheduled or synchronous;

Power-Save-Multi-Poll: an extension to U-APSD and S-APSD that reserves a time slot to a MIMO station and thereby temporarily silences others associated with the station;

Dynamic-MIMO-Power-Save: allows MIMO PHY devices to scale-down to less-aggressive/low-power configurations;

Wi-Fi-Direct Opportunistic-Power-Save: allows peer-to-peer group owners to enter low power states during a limited period when all peer-to-peer clients in the group are expected not to transmit; and Wi-Fi-Direct Notice-of-Absence: requires peer-to-peer group owners to advertise low power schedule to signal peer-to-peer clients in the group when to cease transmitting.

Figure 7:
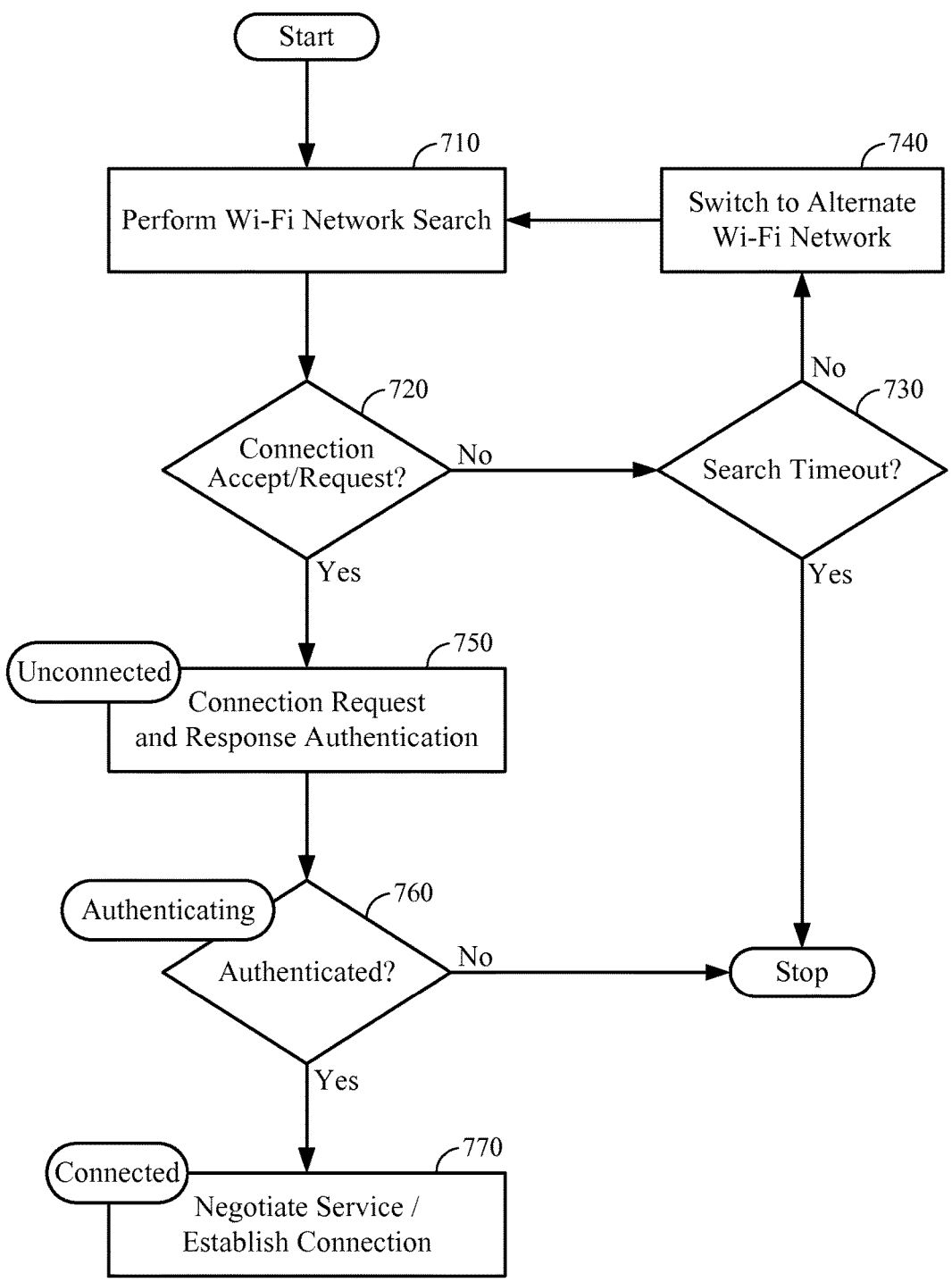
FIG. 7 illustrates an exemplary method that may provide connection control in a dual-mode Wi-Fi network, according to various aspects of the disclosure.

According to various aspects of the disclosure, FIG. 7 illustrates an exemplary method that may provide connection control in a dual-mode Wi-Fi network, wherein multiple Wi-Fi subsystems associated with a particular source and/or sink device in a wireless dock system may perform the method shown therein to appropriately connect to a Wi-Fi network in order to transmit and/or receive queued traffic. For example, in one embodiment, a dual-mode source and/or sink device may have an 802.11ac subsystem and an 802.11ad subsystem that may each carry out the method shown in FIG. 7 to connect to an appropriate Wi-Fi network.

In one embodiment, the method may initially include performing a Wi-Fi network search at block 710 in order to discover any nearby access points or other Wi-Fi enabled devices in proximity. When the Wi-Fi network search does not return any nearby access points or other Wi-Fi enabled devices that are requesting and/or accepting connections, the searching Wi-Fi subsystem may then determine whether a search timeout has elapsed at block 730, in which case the method may stop without establishing a successful connection. Alternatively, if the search timeout has not elapsed, the searching Wi-Fi subsystem may switch to an alternate Wi-Fi network at block 740 and conduct another search at block 710 to determine whether there are any nearby access points or other Wi-Fi enabled devices that are requesting and/or accepting connections on the alternate Wi-Fi network, wherein this procedure may continue until a nearby access point or another Wi-Fi enabled device requesting and/or accepting connections has been found or the search timeout elapses.

In one embodiment, in response to the Wi-Fi network search returning a nearby access point or another Wi-Fi enabled device accepting and/or requesting connections, a connection request and authentication procedure may then be initiated at block 750. For example, in one embodiment, the Wi-Fi subsystem may attempt to associate with the nearby access point or other Wi-Fi enabled device and exchange any authentication credentials that may be required to form the association. In one embodiment, the Wi-Fi subsystem may then determine whether the authentication succeeded at block 760 and negotiate services to establish a connection at block 770 if the authentication succeeded. Otherwise, if the authentication did not succeed, the method may terminate without establishing a successful connection.

Figure 8:
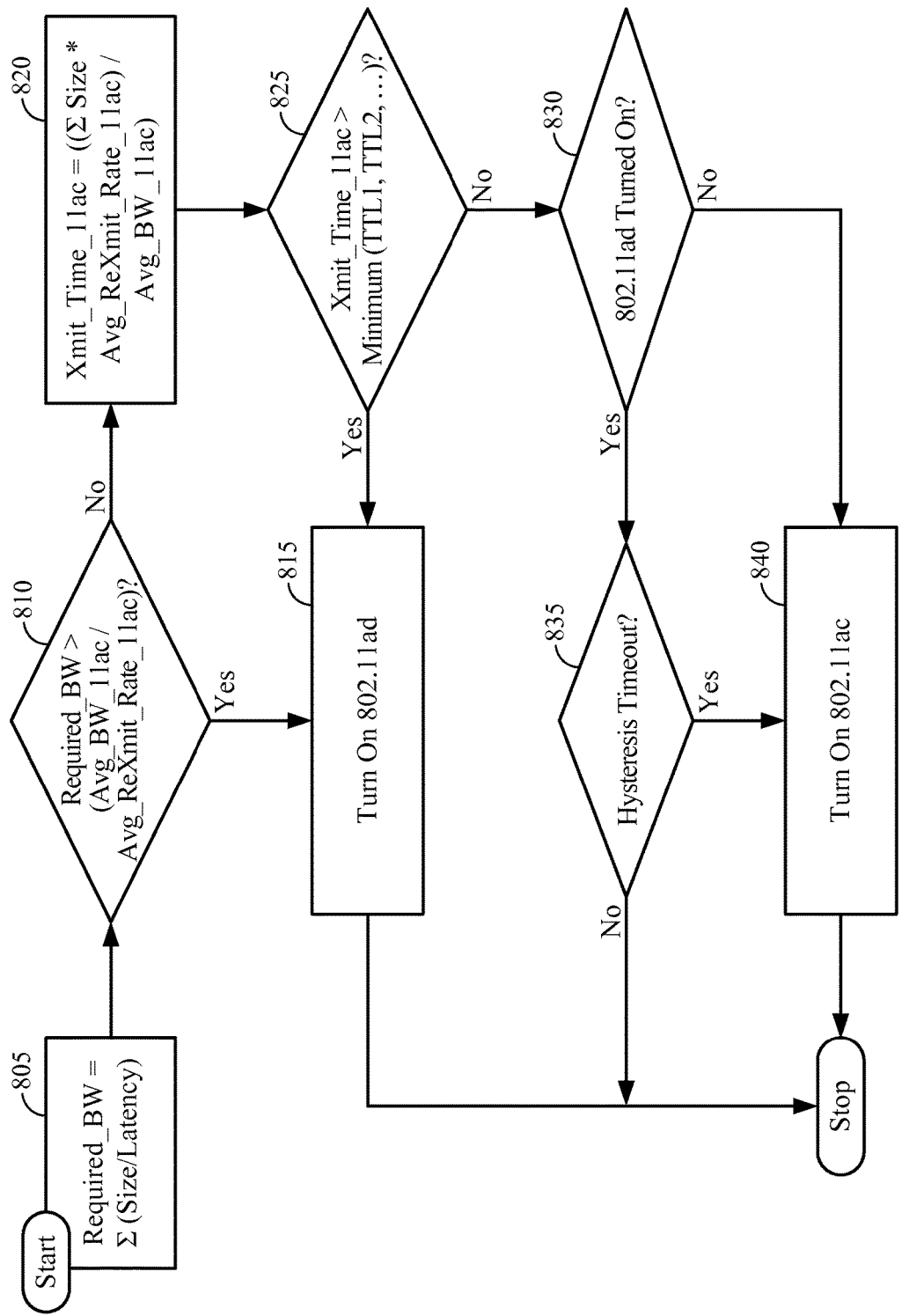
FIG. 8 illustrates an exemplary method that may provide demand-based analysis in a dual-mode Wi-Fi network, according to various aspects of the disclosure.

According to various aspects of the disclosure, FIG. 8 illustrates an exemplary method that may provide demand-based analysis in a dual-mode Wi-Fi network, wherein the method shown in FIG. 8 may generally be performed using the collaborative DiffServ framework described above in order to determine whether to activate or deactivate different Wi-Fi subsystems on a dual-mode Wi-Fi device. In particular, at block 805, the collaborative DiffServ framework may determine a bandwidth requirement associated with queued forward traffic, wherein a size associated with each forward packet may be divided by a latency associated therewith and the size-to-latency ratio associated with all forward packets may be summed to determine the bandwidth requirement. For example, assuming that the forward traffic includes a first packet having a 64K size and a 10 ms latency requirement and a second packet having a 32K size and a 2 ms latency requirement, the bandwidth requirement would be 22.4K per second (i.e., 6.4K/s for the first packet and 16K/s for the second packet, which sums to 22.4K/s). However, those skilled in the art will appreciate that the above example is provided for illustration purposes only and that actual implementations will vary depending on the number of forward packets and the size and latency requirements associated therewith, which may further vary depending on the application or service (e.g., high performance services may have larger packet sizes and lower latency requirements and therefore higher bandwidth requirements, while typical services may have smaller packet sizes and less demanding latency requirements that result in lower bandwidth requirements).

In one embodiment, in response to having calculated the bandwidth that the forward traffic require, the collaborative DiffServ framework may determine whether the required bandwidth exceeds a threshold that indicates whether a Wi-Fi subsystem providing conventional performance (e.g., the 802.11ac subsystem) can suitably handle the forward traffic at block 810. For example, in one embodiment, the threshold used in the determination at block 810 may comprise an average bandwidth associated with the conventional Wi-Fi subsystem divided by an average retransmission rate, which may be compared to the required bandwidth associated with the forward traffic. Accordingly, in response to determining that the forward traffic has a bandwidth requirement that exceeds the average bandwidth-to-retransmission rate associated with the conventional Wi-Fi subsystem, the conventional Wi-Fi subsystem may not offer sufficient performance to handle the forward traffic and the high-performance Wi-Fi subsystem (e.g., the 802.11ad subsystem) may be turned on at block 815. However, if the bandwidth requirement associated with the forward traffic does not exceed the average bandwidth-to-retransmission rate associated with the conventional Wi-Fi subsystem, the collaborative DiffServ framework may further predict a transmission time that would be required to send the forward traffic using the conventional Wi-Fi subsystem at block 820.

For example, in one embodiment, the predicted transmission time may be calculated at block 820 by dividing the average retransmission rate associated with the conventional Wi-Fi subsystem by the average bandwidth associated with the conventional Wi-Fi subsystem, and calculating a sum from multiplying the size associated with each forward packet by the average retransmission rate-to-bandwidth ratio. In one embodiment, the predicted transmission time calculated at block 820 may then be compared to a minimum time-to-live (TTL) among the various forward packets at block 825, wherein the conventional Wi-Fi subsystem may not offer sufficient performance to handle the forward traffic if the predicted transmission time calculated at block 820 may then be compared to a minimum time-to-live (TTL) among the various forward packets at block 825, wherein the conventional Wi-Fi subsystem may not offer sufficient performance to handle the forward traffic if the predicted transmission time exceeds the minimum TTL in which case the high-performance Wi-Fi subsystem may be turned on at block 815.

Otherwise, in response to determining that the bandwidth requirement associated with the forward traffic does not exceed the average bandwidth-to-retransmission rate associated with the conventional Wi-Fi subsystem and that the predicted transmission time using the conventional Wi-Fi subsystem does not exceed the minimum TTL among the various forward packets, the conventional Wi-Fi subsystem may be determined to offer sufficient performance to handle the forward traffic. In that case, the method may comprise determining whether the high-performance Wi-Fi subsystem is turned on at block 830, in which case a further determination may be made as to whether a hysteresis timeout has elapsed at block 835. In particular, the hysteresis timeout may generally comprise a value defined to reduce "ping-ponging" between different Wi-Fi networks, whereby a timer may be started when the high-performance Wi-Fi subsystem is turned on to indicate how long the high-performance Wi-Fi subsystem has been active. Accordingly, in one embodiment, the conventional Wi-Fi subsystem may be turned on at block 840 if the timer indicating how long the high-performance Wi-Fi subsystem has been active exceeds the hysteresis timeout value such that switching to the conventional Wi-Fi subsystem may be considered suitable under those conditions. Otherwise, if the timer that indicates how long the high-performance Wi-Fi subsystem has been active does not exceed the hysteresis timeout value, the source device may be prevented from switching to the conventional Wi-Fi subsystem and the high-performance Wi-Fi subsystem may be allowed to handle the forward traffic in order to avoid excessive ping-ponging among the different Wi-Fi subsystems (even though the conventional Wi-Fi subsystem may offer adequate performance to handle the forward traffic). However, when the calculations made at blocks 810, 820, and 825 indicate that the conventional Wi-Fi subsystem offers adequate performance to handle the forward traffic and the subsequent determination made at block 830 indicates that the high-performance Wi-Fi subsystem is not turned on, the conventional Wi-Fi subsystem may be activated at block 840 and used to transmit the forward traffic.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for demand-based dual-mode Wi-Fi networking control, comprising:
   determining a relative bandwidth requirement associated with one or more forward packets to transmit from a source device that includes at least a first Wi-Fi subsystem and a second Wi-Fi subsystem having one or more transceivers, wherein the first Wi-Fi subsystem has a higher performance level than the second Wi-Fi subsystem;
   selecting either the first Wi-Fi subsystem or the second Wi-Fi subsystem based on at least the bandwidth requirement associated with the one or more forward packets and the performance levels associated with the first and second Wi-Fi subsystems; and
   transmitting the one or more forward packets using the selected Wi-Fi subsystem.

2. The method recited in claim 1, further comprising:
   reserving the first Wi-Fi subsystem having the higher performance level to forward traffic that has one or more performance requirements that cannot be satisfied using a wireless technology associated with the second Wi-Fi subsystem.

3. The method recited in claim 1, further comprising:
   sending one or more call-ahead signals to a connection manager configured to control the first Wi-Fi subsystem and the second Wi-Fi subsystem, wherein the one or more call-ahead signals instruct the connection manager to activate the selected Wi-Fi subsystem.

4. The method recited in claim 3, further comprising:
   performing a service negotiation with a sink device intended to receive the one or more forward packets, wherein the service negotiation instructs the sink device to activate a physical transceiver that implements a wireless technology corresponding to the selected Wi-Fi subsystem used to transmit the one or more forward packets.

5. The method recited in claim 1, wherein calculating the bandwidth requirement associated with the one or more forward packets comprises:
   dividing a size associated with each forward packet by a latency requirement associated with each forward packet, wherein the bandwidth requirement comprises a first value obtained from summing the size associated with each forward packet divided by the latency requirement associated with each forward packet.

6. The method recited in claim 5, wherein selecting either the first Wi-Fi subsystem or the second Wi-Fi subsystem comprises:
   selecting the first Wi-Fi subsystem in response to the first value exceeding a second value obtained from dividing an average bandwidth associated with the second Wi-Fi subsystem by an average retransmission rate associated with the second Wi-Fi subsystem.

7. The method recited in claim 1, wherein selecting either the first Wi-Fi subsystem or the second Wi-Fi subsystem comprises:
   determining a minimum time-to-live among the one or more forward packets; and
   predicting a time to transmit the one or more forward packets with the second Wi-Fi subsystem, wherein the predicted time to transmit the one or more forward packets with the second Wi-Fi subsystem comprises a sum of a size associated with each forward packet multiplied by an average retransmission rate associated with the second Wi-Fi subsystem divided by an average bandwidth associated with the second Wi-Fi subsystem; and
   selecting the first Wi-Fi subsystem in response to determining that the minimum time-to-live among the one or more forward packets equals or exceeds the predicted time to transmit the one or more forward packets with the second Wi-Fi subsystem.

8. The method recited in claim 1, wherein selecting either the first Wi-Fi subsystem or the second Wi-Fi subsystem comprises:
   determining whether the bandwidth requirement associated with the one or more forward packets exceeds a threshold value based on an average bandwidth and an average retransmission rate associated with the second Wi-Fi subsystem; and
   selecting the second Wi-Fi subsystem in response to determining that the bandwidth requirement associated with the one or more forward packets does not exceed the threshold value and that a predicted time to transmit the one or more forward packets with the second Wi-Fi subsystem exceeds a minimum time-to-live among the one or more forward packets.

9. The method recited in claim 1, wherein selecting either the first Wi-Fi subsystem or the second Wi-Fi subsystem comprises:
   determining that the second Wi-Fi subsystem can satisfy the bandwidth requirement associated with the one or more forward packets and further determining that the first Wi-Fi subsystem is turned on; and
   selecting the first Wi-Fi subsystem if a time since the first Wi-Fi subsystem was turned on does not exceed a hysteresis timeout value or the second Wi-Fi subsystem if the time since the first Wi-Fi subsystem was turned on equals or exceeds the hysteresis timeout value.

10. The method recited in claim 1, further comprising:
    instructing the first Wi-Fi subsystem and the second Wi-Fi subsystem to enter a low power mode in response to determining that no additional forward packets are pending transmission from the source device subsequent to transmitting the one or more forward packets using the selected Wi-Fi subsystem.

11. The method recited in claim 1, wherein the bandwidth requirement is calculated based on a collaborative DiffServ analysis that prioritizes the one or more forward packets according to one or more quality of service requirements associated therewith.

12. The method recited in claim 1, wherein the first Wi-Fi subsystem implements 802.11ad technology and the second Wi-Fi subsystem implements one or more of 802.11n technology or 801.11ac technology.

13. An apparatus, comprising:
    a first Wi-Fi subsystem;
    a second Wi-Fi subsystem, wherein the first Wi-Fi subsystem has a higher performance level than the second Wi-Fi subsystem; and
    one or more processors configured to:
       determine a relative bandwidth requirement associated with one or more forward packets to transmit from the apparatus;
       select either the first Wi-Fi subsystem or the second Wi-Fi subsystem based on at least the bandwidth requirement associated with the one or more forward packets and the performance levels associated with the first and second Wi-Fi subsystems; and
       utilize the selected Wi-Fi subsystem to transmit the one or more forward packets.

14. The apparatus recited in claim 13, wherein the one or more processors are further configured to:
    reserve the first Wi-Fi subsystem having the higher performance level to forward traffic that has one or more performance requirements that cannot be satisfied using a wireless technology associated with the second Wi-Fi subsystem.

15. The apparatus recited in claim 13, wherein the one or more processors are further configured to:
    send one or more call-ahead signals to a connection manager configured to control the first Wi-Fi subsystem and the second Wi-Fi subsystem, wherein the one or more call-ahead signals instruct the connection manager to activate the selected Wi-Fi subsystem; and
    perform a service negotiation with a sink device intended to receive the one or more forward packets, wherein the service negotiation instructs the sink device to activate a physical transceiver that implements a wireless technology corresponding to the selected Wi-Fi subsystem used to transmit the one or more forward packets.

16. The apparatus recited in claim 13, wherein the one or more processors are further configured to:
    divide a size associated with each forward packet by a latency requirement associated with each forward packet, wherein the bandwidth requirement comprises a first value obtained from summing the size associated with each forward packet divided by the latency requirement associated with each forward packet; and
    select the first Wi-Fi subsystem in response to the first value exceeding a second value obtained from dividing an average bandwidth associated with the second Wi-Fi subsystem by an average retransmission rate associated with the second Wi-Fi subsystem.

17. The apparatus recited in claim 13, wherein the one or more processors are further configured to:
    determine whether the bandwidth requirement associated with the one or more forward packets exceeds a threshold value based on an average bandwidth and an average retransmission rate associated with the second Wi-Fi subsystem; and
    select the second Wi-Fi subsystem in response to determining that the bandwidth requirement associated with the one or more forward packets does not exceed the threshold value and that a predicted time to transmit the one or more forward packets with the second Wi-Fi subsystem exceeds a minimum time-to-live among the one or more forward packets.

18. The apparatus recited in claim 13, wherein the one or more processors are further configured to:
    instruct the first Wi-Fi subsystem and the second Wi-Fi subsystem to enter a low power mode in response to determining that no additional forward packets are pending transmission subsequent to transmitting the one or more forward packets using the selected Wi-Fi subsystem.

19. An apparatus, comprising:
   means for determining a relative bandwidth requirement associated with one or more forward packets to transmit from the apparatus, wherein the apparatus includes at least a first Wi-Fi subsystem and a second Wi-Fi subsystem having one or more transceivers, and wherein the first Wi-Fi subsystem has a higher performance level than the second Wi-Fi subsystem;
   means for selecting either a first Wi-Fi subsystem or a second Wi-Fi subsystem based on at least the bandwidth requirement associated with the one or more forward packets and the performance levels associated with the first and second Wi-Fi subsystems; and
   means for transmitting the one or more forward packets using the selected Wi-Fi subsystem.

20. The apparatus recited in claim 19, further comprising:
   means for reserving the first Wi-Fi subsystem having the higher performance level to forward traffic that has one or more performance requirements that cannot be satisfied using a wireless technology associated with the second Wi-Fi subsystem.

21. The apparatus recited in claim 19, further comprising:
   means for sending one or more call-ahead signals to a connection manager configured to control the first Wi-Fi subsystem and the second Wi-Fi subsystem, wherein the one or more call-ahead signals instruct the connection manager to activate the selected Wi-Fi subsystem; and
   means for performing a service negotiation with a sink device intended to receive the one or more forward packets, wherein the service negotiation instructs the sink device to activate a physical transceiver that implements a wireless technology corresponding to the selected Wi-Fi subsystem used to transmit the one or more forward packets.

22. The apparatus recited in claim 19, wherein the means for calculating the bandwidth requirement associated with the one or more forward packets comprises:
   means for dividing a size associated with each forward packet by a latency requirement associated with each forward packet, wherein the bandwidth requirement comprises a first value obtained from summing the size associated with each forward packet divided by the latency requirement associated with each forward packet; and
   means for selecting the first Wi-Fi subsystem in response to the first value exceeding a second value obtained from dividing an average bandwidth associated with the second Wi-Fi subsystem by an average retransmission rate associated with the second Wi-Fi subsystem.

23. The apparatus recited in claim 19, wherein the means for selecting either the first Wi-Fi subsystem or the second Wi-Fi subsystem comprises:
   means for determining whether the bandwidth requirement associated with the one or more forward packets exceeds a threshold value based on an average bandwidth and an average retransmission rate associated with the second Wi-Fi subsystem; and
   means for selecting the second Wi-Fi subsystem in response to determining that the bandwidth requirement associated with the one or more forward packets does not exceed the threshold value and that a predicted time to transmit the one or more forward packets with the second Wi-Fi subsystem exceeds a minimum time-to-live among the one or more forward packets.

24. The apparatus recited in claim 19, further comprising:
   means for instructing the first Wi-Fi subsystem and the second Wi-Fi subsystem to enter a low power mode in response to determining that no additional forward packets are pending transmission from the apparatus subsequent to transmitting the one or more forward packets using the selected Wi-Fi subsystem.

25. A non-transitory computer-readable storage medium having computer-executable instructions recorded thereon, wherein executing the computer-executable instructions on one or more processors causes the one or more processors to:
   determine a relative bandwidth requirement associated with one or more forward packets to transmit from a source device that includes at least a first Wi-Fi subsystem and a second Wi-Fi subsystem having one or more transceivers, and wherein the first Wi-Fi subsystem has a higher performance level than the second Wi-Fi subsystem;
   select either the first Wi-Fi subsystem or the second Wi-Fi subsystem based on at least the bandwidth requirement associated with the one or more forward packets and the performance levels associated with the first and second Wi-Fi subsystems; and
   transmit the one or more forward packets using the selected Wi-Fi subsystem.

26. The non-transitory computer-readable storage medium recited in claim 25, wherein executing the computer-executable instructions on the one or more processors further causes the one or more processors to:
   reserve the first Wi-Fi subsystem having the higher performance level to forward traffic that has one or more performance requirements that cannot be satisfied using a wireless technology associated with the second Wi-Fi subsystem.

27. The non-transitory computer-readable storage medium recited in claim 25, wherein executing the computer-executable instructions on the one or more processors further causes the one or more processors to:
   send one or more call-ahead signals to a connection manager configured to control the first Wi-Fi subsystem and the second Wi-Fi subsystem, wherein the one or more call-ahead signals instruct the connection manager to activate the selected Wi-Fi subsystem; and
   perform a service negotiation with a sink device intended to receive the one or more forward packets, wherein the service negotiation instructs the sink device to activate a physical transceiver that implements a wireless technology corresponding to the selected Wi-Fi subsystem used to transmit the one or more forward packets.

28. The non-transitory computer-readable storage medium recited in claim 25, wherein executing the computer-executable instructions on the one or more processors further causes the one or more processors to:
   divide a size associated with each forward packet by a latency requirement associated with each forward packet, wherein the bandwidth requirement comprises a first value obtained from summing the size associated with each forward packet divided by the latency requirement associated with each forward packet; and
   select the first Wi-Fi subsystem in response to the first value exceeding a second value obtained from dividing an average bandwidth associated with the second Wi-Fi subsystem by an average retransmission rate associated with the second Wi-Fi subsystem.

29. The non-transitory computer-readable storage medium recited in claim 25, wherein executing the computer-executable instructions on the one or more processors further causes the one or more processors to:
- determine whether the bandwidth requirement associated with the one or more forward packets exceeds a threshold value based on an average bandwidth and an average retransmission rate associated with the second Wi-Fi subsystem; and
- select the second Wi-Fi subsystem in response to determining that the bandwidth requirement associated with the one or more forward packets does not exceed the threshold value and that a predicted time to transmit the one or more forward packets with the second Wi-Fi subsystem exceeds a minimum time-to-live among the one or more forward packets.

30. The non-transitory computer-readable storage medium recited in claim 25, wherein executing the computer-executable instructions on the one or more processors further causes the one or more processors to:
- instruct the first Wi-Fi subsystem and the second Wi-Fi subsystem to enter a low power mode in response to determining that no additional forward packets are pending transmission from the source device subsequent to transmitting the one or more forward packets using the selected Wi-Fi subsystem.

* * * * *